United States Patent

Willis et al.

[11] 3,888,928
[45] June 10, 1975

[54] 1,4-BIS(DIALLYLAMINOMETHYL)-BENZENE

[75] Inventors: Donald Willis, Blackburn; Hendrik Adriaan Jacobus Battaerd, North Clayton; Gunter Anton Lang, Tullamarine; Donald Eric Weiss, Blackburn, all of Australia

[73] Assignees: ICI Australia Limited, Melbourne; Commonwealth Scientific and Industrial Research Organization, Campbell, both of Australia

[22] Filed: July 31, 1972

[21] Appl. No.: 276,528

[52] U.S. Cl......... 260/570.9; 204/138 HE; 210/37; 260/89.7
[51] Int. Cl.............................. C07c 87/28
[58] Field of Search ................... 260/570.9

[56] References Cited
UNITED STATES PATENTS

| | | | |
|---|---|---|---|
| 2,220,834 | 11/1940 | Bruson et al............. | 260/570.9 X |
| 2,375,015 | 5/1945 | Marple et al............ | 260/464 |
| 2,871,229 | 1/1959 | Price..................... | 260/85.5 |
| 3,271,435 | 9/1966 | Randall et al............ | 260/570.9 X |
| 3,406,024 | 10/1968 | Richter et al............ | 260/570.9 X |

OTHER PUBLICATIONS

Kawata et al., "Chemical Abstracts," Vol. 63, page 18275c (1965).
Butler et al., "Journal American Chemical Society," Vol. 71, pages 3120–3122 (1949).

*Primary Examiner*—B. V. Hines
*Attorney, Agent, or Firm*—Cushman, Darby & Cushman

[57] ABSTRACT

A novel monomer of general formula:

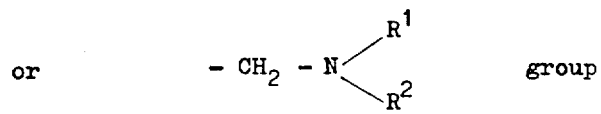

wherein $R^1$ is a mono-olefinically unsaturated group containing from 2 to 6, inclusive, carbon atoms; $R^2$ is either a hydrogen atom or an alkyl, substituted alkyl, which group being either saturated or olefinically unsaturated; $R^3$, $R^4$, $R^5$, $R^6$ and $R^7$ separately, is a hydrogen or halogen atom or an alkyl, substituted alkyl, dialkylaminoalkyl, aryl, nitro, substituted aryl or 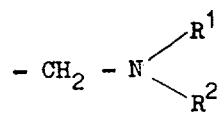 group except that not more than two of $R^3$, $R^4$, $R^5$, $R^6$ and $R^7$ may be the group and except that not more than four of $R^3$, $R^4$, $R^5$, $R^6$ and $R^7$ may be hydrogen. The monomers are polymerised or copolymerised to form polymeric materials having ion exchange properties.

1 Claim, No Drawings

1,4-BIS(DIALLYLAMINOMETHYL)-BENZENE

This invention relates to novel monomers and to polymers and copolymers derived therefrom, it also relates to methods of manufacturing said monomers, polymers and copolymers.

We have found a new class of monomers which may be polymerised or copolymerised to form polymeric material having desirable properties. For example certain of these new polymers and copolymers are of use in the desalination of water by the so-called "Sirotherm" ("Sirotherm" is a Trade Mark for thermally regenerable ion exchange resins) process, which is described in the publications:

"The "Sirotherm" Demineralisation Process — an Ion Exchange Process with Thermal Regeneration", Part 1, J. Inst. Engr. Aust. (1965) 37, 193;

"An Ion Exchange Process with Thermal Regeneration", Aust. J. Chem. (1966) 19, 561 (Part II), 589 (Part III), 765 (Part IV) and 791 (Part V); Australian Journal of Chemistry, 1968, Vol. 21, pp. 2703 – 2710, "An Ion Exchange Process with Thermal Regeneration", Part VI; "Thermally Regenerated Ion Exchange Process — An Aid to Water Management", J. Water Poll. Control Fed. (1966) 38, 1782; and Australian Patent No. 274,029.

Accordingly we provide a novel monomer of general formula:

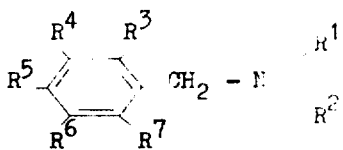

wherein $R^1$ is a mono-olefinically unsaturated group containing from 2 to 6 inclusive, carbon atoms; $R^2$ is either a hydrogen atom or an alkyl or substituted alkyl, which group being either saturated or olefinically unsaturated; $R^3$, $R^4$, $R^5$, $R^6$ and $R^7$ separately, is a hydrogen or halogen atom or an alkyl, substituted alkyl, aryl, substituted aryl, nitro, dialkylamino alkyl or

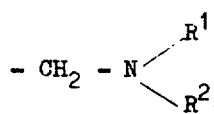

except that not more than two of $R^3$, $R^4$, $R^5$, $R^6$ and $R^7$ may be the group

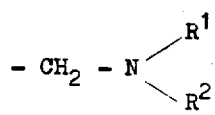

and except that not more than four of $R^3$, $R^4$, $R^5$, $R^6$ and $R^7$ may be hydrogen.

Preferably the mono-olefinically unsaturated group or groups contain from 2 to 4 inclusive carbon atoms, for example, the group may be allyl or vinyl. A preferred class of compounds of general formula I as defined hereinbefore consists of compounds of general formula II:

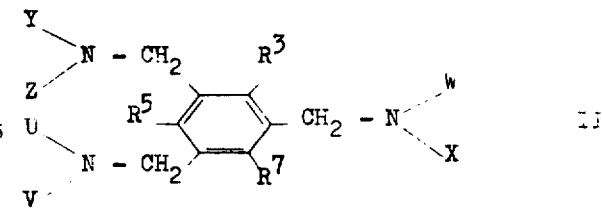

wherein $R^3$, $R^5$ and $R^7$ are as defined hereinabove and U, V, W, X, Y and Z, separately, is a mono-olefinically unsaturated group which group contains from 2 to 4 inclusive carbon atoms and is preferably allyl or vinyl. A further preferred class of compounds of general formula I as defined hereinbefore consists of compounds of general formula III:

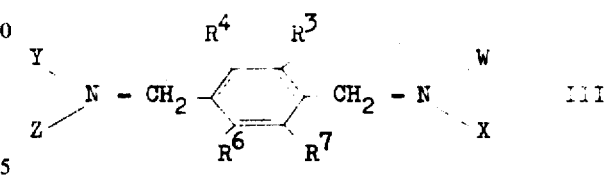

wherein $R^3$, $R^4$, $R^6$ and $R^7$ are as defined hereinabove and W, X, Y and Z, separately, is a mono-olefinically unsaturated group which group contains from 2 to 4 inclusive carbon atoms and is preferably allyl or vinyl.

Particularly preferred compounds are:

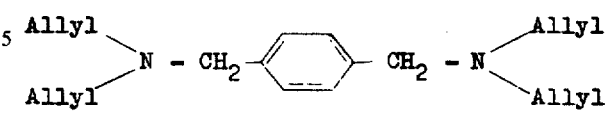

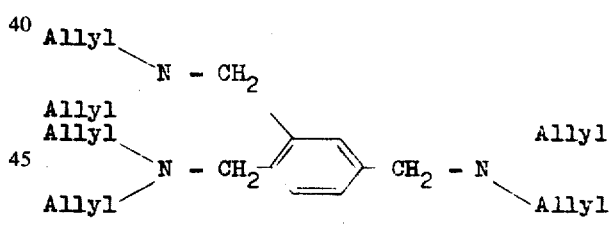

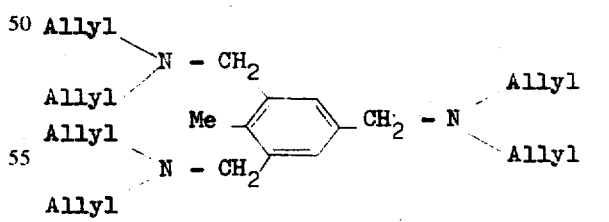

The compounds of our invention may be made by any suitable method known in the art for the preparation of analogous compounds, for example by condensing a suitable chlorinated compound with a suitable amine.

Accordingly we provide a process of manufacturing compounds of general formula I as defined hereinabove by condensing compounds of general formula IV with an amine of general formula V:

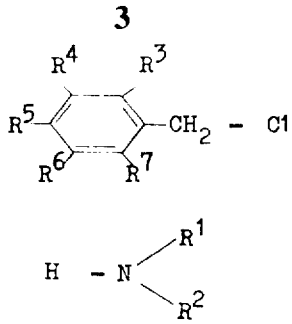

wherein R¹, R², R³, R⁴, R⁵, R⁶ and R⁷ are as defined hereinbefore. Thus, 1,4-bis(N,N-diallylaminomethyl) benzene may be made, for example, by condensing diallylamine with alpha, alpha' dichloro-para-xylene.

Certain of the new monomers of our invention which contain more than one olefinically unsaturated group may be used as agents for cross-linking polymers of monoolefinically unsaturated monomers. Certain of our monomers, for example, some monomers containing allyl groups as the olefinically unsaturated group, are of particular use as cross-linking agents because of the difficulty with which they undergo self-polymerisation. To be effective as a cross-linking agent the monomers of our invention should be soluble in the polymer to be cross-linked. The solubility characteristics of the monomers of our invention may be modified by substitution into the molecule of appropriate solubilising groups. The choice of solubilising group to be substituted on to the monomer depends on the nature of the polymer to be cross-linked. For example for non-polar aliphatic polymers such as polyolefines for example polyethylene we prefer to use as cross-linking agents monomers of our invention substituted with higher alkyl substituents for example alkyl groups containing from 10 to 30 carbon atoms. For cross-linking polar polymers and for water swellable or water miscible polymers we prefer to use monomers of our invention substituted with more polar substituents. For cross-linking polymers of intermediate nature the suitable substituents for the monomer of our invention may be found by simple experiment.

The new monomers of our invention may be used in the manufacture of new polymers and copolymers.

Accordingly in a further aspect of our invention we provide polymeric compounds comprising between 3 to 100 mole % of mer-units of general formula I as hereinbefore defined.

The new polymers may be homopolymers consisting solely of mer-units of a compound of general formula I or may be copolymers consisting of a mixture of mer units. The mer-units forming the copolymer may be all of general formula I or may be a mixture of one or more compounds of general formula I with other olefinically unsaturated monomers such as, for example, vinylic or allylic compounds, for example, allylamine, diallylamine, N-alkyl diallylamines, N-benzyl diallylamine and substituted derivatives, N-benzyl N-methyl allylamine, triallylamine and acrylonitrile.

The polymeric compounds so formed have properties which depend in part upon the substituents in the monomer of our invention. Thus by suitable choice of substituents polymeric materials may be obtained of use in the normal outlets for polymeric materials, for example, moulding powders, extruded articles, films, surface coatings, latex for paint, and, in particular, for use in ion exchange resins. The amino groups in the polymeric materials derived from our new monomers give the polymeric materials a certain amount of anionic ion exchange capacity.

The ion exchange behaviour of the resins may be modified by forming the polymeric material from monomers of general formula I in which one or more of the substituents R³, R⁴, R⁵, R⁶ and R⁷ are dialkylamino alkyl groups.

Ion exchange resins of particular use in the so-called "Sirotherm" process for the desalination of brackish water may be obtained from certain monomers of general formula I wherein one or more of R³, R⁴, R⁵, R⁶ and R⁷ separately, is a hydrogen atom or an alkyl, substituted alkyl, dialkylaminoalkyl or

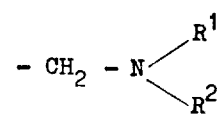

Suitable monomers for use in the preparation of ion exchange resins suitable for use in the "Sirotherm" process include, for example:
1,4-bis(N,N-diallylaminomethyl) benzene,
2,4,6-tris(N,N-diallylaminomethyl) toluene,
N-(4-methylbenzyl) diallylamine,
N-(4-N',N'-dimethylaminomethylbenzyl) diallylamine
N-(4-N',N'-diethylaminomethylbenzyl) diallylamine
N-(4-N',N'-dipropylaminomethylbenzyl) diallylamine
N-(4-N',N'-diisopropylaminomethylbenzyl) diallylamine.
1,2,4-tris(N,N-diallylaminomethyl)benzene The methods of polymerising and copolymerising compounds of general formula I are those generally known in the art for the polymerisation of analogous known olefinically unsaturated monomers. Such methods include addition of free radical initiators such as, for example, benzoyl peroxide or ammonium persulphate. For polymerisation in aqueous media we prefer to use azo bis(isobutyramidinium chloride) as the initiator.

Certain monomers of our invention for example some monomers containing allyl groups are not very reactive and therefore require considerable amounts of free radical initiators which can lead to impurities in the resultant polymers and copolymers. For polymerisation and copolymerisation of monomers containing allyl groups we prefer to use irradiation as the initiator. Irradiation can be used to initiate the polymerisation or copolymerisation of all the compounds of general formula I optionally in the form of salts.

It will be understood by those skilled in the art that, in order to polymerise in aqueous media, certain of our monomers must be present as salts. Hence all references in this specification to the polymerisation of our monomers even when not specifically described as salts, are to the monomers in their polymerisable state.

Accordingly in a preferred aspect of our invention we provide a process of manufacturing polymeric compounds which compounds contain from 3 to 100 mole % of mer-units of general formula I as hereinbefore defined, said process comprising exposing a mixture of monomers, comprising from 3 to 100 mole % of monomers of general formula I optionally in the form of salts of a strong acid, to high energy radiation at a temperature of between −80° and 120°C and isolating the polymer or polymer salt so formed. Suitable strong acids are hydrochloric, sulphuric, phosphoric and trichloracetic acids.

By high energy radiation we mean radiation having a wavelength of less than 100 Angstrom, in particular gamma- and beta- rays derived from isotopes or in the form of fast electrons such as produced by a Van de Graaff generator and an electron accelerator. Other sources of ionising or high energy radiation are known in the art, e.g. from British Patent No. 801,528, page 1, lines 49 – 56; these include neutrrons, accelerated heavy particles and X-rays or mixtures of them. A convenient practical source of high energy radiation is a Cobalt 60 source.

The dose rate of irradiation controls the rate of initiation of the polymerisation, but has little effect on the properties of the polymer formed. Dose rates between 10 rads/hr and 5 megarads/hr are operative and rates between 20,000 rads/hr and 1 megarad/hr are convenient in practice. However, the total dose delivered to the polymerisation mixture affects the yield as well as the physical properties of the polymer produced. Doses from 3 megarad up to 20 megarad are operative; optimum yield of polymer is usually achieved at 5 to 15 megarad. At doses above 10 megarad the polymer formed has reduced residual unsaturation, possibly due to further cross-linking of the resin.

Radiation, usually and preferably, is carried out in an inert atmosphere such as nitrogen or argon. The presence of air does not stop the polymerisation, but a reduction in yield and capacity was observed.

For use as ion exchange resins the polymers and copolymers of this invention must be produced within controlled particle size ranges. For this purpose precipitation polymerisation and dispersion polymerisation are preferred.

The precipitation polymerisation of a salt, e.g. the hydrochloride of a compound of general formula I, comprises polymerising the monomer under irradiation in a binary liquid mixture consisting of a solvent for the monomer salt and which also dissolves or swells the polymer salt, such as water, and a non-solvent for the polymer salt such as dioxan or acetone; this leads to a product consisting of quasi spherical particles of a mean diameter from 0.5 to 20 micron, depending on the choice of the concentration of the monomer and the ratio and type of solvent to non-solvent. Copolymers of similar particle size of a compound of general formula I with another comer may be prepared in binary liquid systems in the same manner as that used for the manufacture of the homopolymer. For the system water-dioxan suitable volume ratios of solvent to non-solvent are from 0.2:1 to 1.5:1; in the system water-acetone suitable ratios of solvent to non-solvent are from 0.04:1 to 0.8:1, preferably from 0.08:1 to 0.6:1. Solvents suitable for the monomers salts and polymer salts are for example water, methanol, ethanol, dimethyl formamide, dimethyl sulphoxide and other polar solvents. Non-solvents suitable for the polymer salts of this process are exemplified by, but not limited to, dioxan, THF, acetone, ethylmethyl ketone, methyl butyl ketone. Other solvent pairs will be obvious to those skilled in the art.

Accordingly in a preferred aspect of our invention we provide a process for the precipitation polymerisation of a mixture of monomers said mixture comprising from 3 to 100 mole % of a compound or compounds of general formula I or salts thereof to form a polymer of quasispherical particles having a mean diameter from 0.5 to 20 microns which process comprises polymerising the mixture of monomers under irradiation in a binary liquid mixture consisting of water and acetone.

For larger beads, equivalent to the conventional ion exchange resins, the dispersion polymeriation process is preferred. The size of the beads depends on the concentration of stabilisers, the monomer salt solution, the stirring rate and the geometry of the reaction vessel. Beads between 200 mesh BSS and 10 mesh BSS can easily be achieved. The choice of suspension medium is not narrowly critical, provided the medium is not miscible with the monomer salt solutions. The choice of stabiliser is not narrowly critical; certain surfactants used in dispersion polymerisation, e.g. hydrocarbon soluble amines or quaternary ammonium terminated surface active agents as well as cellulose ethers are suitable.

The invention is not illustrated by, but by no means limited to, the following examples in which all parts are expressed as parts by weight unless otherwise specified.

EXAMPLE 1

Preparation of 1,4-bis(N,N-diallylaminomethyl)benzene

In a 1-litre 3-neck flask fitted with a stirrer, reflux condenser and thermometer were placed 105 g of commercial alpha alpha' dichloro para-xylene and 350 g of diallylamine. The flask was then immersed in an oil bath maintained at a temperature of 50°C. The dichloro para-xylene rapidly dissolved in the diallylamine and as the reaction progressed a crystalline solid separated. After 19 hours the oil bath was removed and the flask and contents cooled to room temperature, before the addition of a solution of 56 g of sodium hydroxide in 250 ml of water. The mixture was transferred to a separating funnel, well shaken and allowed to stand until the two layers had separated. The lower, aqueous layer was then withdrawn and discarded before the upper layer was dried by shaking it with solid sodium hydroxide. After removal of the sodium hydroxide the upper layer was distilled under reduced pressure, there being recovered 240 g of diallylamine and 162 g of an oil, b.p. 123° – 130°C at 0.1 mm Hg pressure, which was identified by elemental analysis, gas chromatography, infra red and nuclear magnetic resonance spectroscopy as 1,4-bis(N,N-diallylaminomethyl) benzene.

EXAMPLE 2

Preparation of N-benzyl diallylamine

This example does not constitute part of our invention but is included to illustrate the general scope of the method for the synthesis of the compounds of our invention.

In a 1 litre 3-neck flask fitted with a stirrer, reflux condenser and thermometer were placed 127 g of benzyl chloride and 389 g of diallylamine. The general procedure of Example 1 was followed except that only 220 ml of an aqueous solution containing 44 g of sodium hydroxide were used. From the reaction there was recovered 183 g of diallylamine and 156 g of a colourless oil, b.p. 64° – 8°C at 0.1 mm Hg pressure, which was identified by elemental analysis, gas chromatography, infra red and nuclear magnetic resonance spectroscopy as N-benzyl diallylamine.

EXAMPLE 3

Preparation of N-(dodecylbenzyl)diallylamine

The procedure of Example 2 was followed except that the benzyl chloride was replaced by 295 g of dodecylbenzyl chloride which had been prepared by chloromethylation of commercial dodecylbenzene. There was isolated from the reaction 285 g of a high boiling oil which was identified as N-(dodecylbenzyl)diallylamine by the methods outlined in Example 2.

EXAMPLE 4

Preparation of N-(p-chlorobenzyl)diallylamine

The procedure of Example 2 was followed except that the benzyl chloride was replaced by 161 g of p-chlorobenzyl chloride. There was isolated from the reaction 173 g of an oil which was identified as N-(p-chlorobenzyl)diallylamine by elemental analysis, gas chromatography, infra red and nuclear magnetic resonance spectroscopy.

EXAMPLE 5

Preparation of N-(3-methylbenzyl)diallylamine

The procedure described in Example 2 was repeated except that the 127 g of benzyl chloride was replaced by 141 g of 3-methylbenzyl chloride. From the reaction there was isolated 165 g of a product which was identified by the methods outlined in Example 2 as N-(3-methylbenzyl) diallylamine.

EXAMPLE 6

Preparation of N-(4-methylbenzyl)diallylamine

The procedure described in Example 2 was repeated except that the 127 g of benzyl chloride was replaced by 185 g of 4-methylbenzyl bromide. From the reaction there was isolated 157 g of a product which was identified by the methods outlined in Example 2 as N-(4-methylbenzyl) diallylamine.

EXAMPLE 7

Preparation of N-(4-isopropylbenzyl)diallylamine

The procedure described in Example 2 was repeated except that the 127 g of benzyl chloride was replaced by 169 g of 4-isopropylbenzyl chloride. From the reaction there was isolated 192 g of a product which was identified by the methods outlined in Example 2 as N-(4-isopropylbenzyl)-diallylamine.

EXAMPLE 8

Preparation of N-(4-bromobenzyl)diallylamine

The procedure described in Example 2 was repeated except that the 127 g of benzyl chloride was replaced by 250 g of 4-bromobenzyl bromide. From the reaction there was isolated 209 g of a product which was identified by the methods outlined in Example 2 as N-(4-bromobenzyl) diallylamine.

EXAMPLE 9

Preparation of N-(4-nitrobenzyl)diallylamine

The procedure described in Example 2 was repeated except that the 127 g of benzyl chloride was replaced by 172 g of 4-nitrobenzyl chloride. From the reaction there was isolated 206 g of a product which was identified by the methods outlined in Example 2 as N-(4-nitrobenzyl) diallylamine.

EXAMPLE 10

Preparation of N-(2-nitrobenzyl)diallylamine

The procedure described in Example 2 was repeated except that the 127 g of benzyl chloride was replaced by 172 g of 2-nitrobenzyl chloride. From the reaction there was isolated 195 g of a product which was identified by the methods outlined in Example 2 as N-(2-nitrobenzyl) diallylamine.

EXAMPLE 11

Preparation of N-(4-phenylbenzyl)diallylamine

The procedure described in Example 2 was repeated except that the 127 g of benzyl chloride was replaced by 203 g of 4-phenylbenzyl chloride. From the reaction there was isolated 178 g of a product which was identified by the methods outlined in Example 2 as N-(4-phenylbenzyl) diallylamine.

EXAMPLE 12

This example demonstrates a convenient method of preparing the hydrochloride salt of the monomers of our invention.

A 500 ml flanged flask was fitted with a lid, anchor stirrer, thermometer, dropping funnel, pH electrode and temperature compensator. 1,4-bis(N,N-diallylaminomethyl) benzene (100 g) was placed in the flask and cooled to 0°C. A 5N solution of aqueous hydrochloric acid was added slowly keeping the temperature between 0°C and 5°C. The hydrochloric acid was added until the amine was neutralised. This method was used to prepare the hydrochlorides of other monomers of our invention, the concentration of the aqueous hydrochloric acid being adjusted so that the solubility of the resulting amine hydrochloride in water was not exceeded. The aqueous solutions obtained were used in the subsequent polymerisations.

EXAMPLE 13

This example demonstrates the polymerisation of 1,-4-bis(N,N-diallylaminomethyl) benzene dihydrochloride using ammonium persulphate as the initiator.

Ethyl cellulose (4g; 'N100'grade) was dissolved in monochlorobenzene (400 ml). Ammonium persulphate (6 g) was dissolved in water (100 ml), and added to 60 mls of 53.7% w/v aqueous solution of 1,4-bis(N,N-diallylaminomethyl) benzene dihydrochloride as prepared in Example 12. The pH of the aqueous solution was adjusted to 1.0 using aqueous hydrochloric acid and 12 mls of a 5% aqueous solution of Elvanol 50/42 (Elvanol 50/42 is a Trade Mark for a polyvinylalcohol) was added. The aqueous solution was added to the monochlorobenzene solution and the mixture emulsified by vigorous mixing using a Silverson stirrer. The emulsion was placed in a 2 l flanged flask fitted with a lid, anchor stirrer, thermometer, nitrogen inlet and reflux condenser. The stirred mixture was heated to 95°C on a water bath under an atmosphere of nitrogen for four hours. The fine white polymer particles produced were filtered off and thoroughly washed. This white product was poly-1,4-bis(N,N-diallylaminomethyl) benzene dihydrochloride in fine particulate form.

'N/100' ethyl cellulose is a description of a grade of ethyl cellulose signifying an ethyl cellulose with an ethoxyl content of 47.5 – 49.0% and a viscosity of 100 centipoises in 5% solution.

EXAMPLE 14

This example demonstrates the radiation induced polymerisation of 1,4-bis(N,N-diallylaminomethyl) benzene dihydrochloride in an unstirred system.

A 50.7% w/v aqueous solution of 1,4-bis(N,N-diallylaminomethyl)benzene dihydrochloride was prepared according to the method of Example 12. 10 mls of this solution was placed in a 50 ml stoppered test tube provided with a tap. The contents of the tube were degassed and then irradiated. Irradiation was carried out in a circular array of eight $Co^{60}$ sources, delivering a dose rate of 0.33 megarads/hour for 30 hours to a total dose rate of 10 megarads. The contents of the tube had polymerised to a clear, hard, brittle gel. The gel was crushed to pass a 25 mesh BSS sieve and washed thoroughly with 2NHCl, 0.5N NaOH and finally water. There was thus obtained a preparation of poly-1,4-bis(N,N-diallylaminomethyl) benzene.

EXAMPLE 15

This example demonstrates the radiation induced polymerisation of 1,4-bis(N,N-diallylaminomethyl)-benzene dihydrochloride in a stirred system.

'N100' ethyl cellulose (0.06 g) was dissolved in monochlorobenzene (100 ml). 5 mls of a 5% aqueous solution of Elvanol 50/42 was added to 25 mls of a 53.7% w/v aqueous solution of pH5 of 1,4-bis(N,N-diallylaminomethyl)benzene dihydrochloride prepared by the method of Example 12. The two mixtures were combined and emulsified by means of a Silverson stirrer. The white emulsion was transferred to a 250 ml flanged flask fitted with a lid, anchor stirrer, $N_2$ inlet tube and tap. The mixture was stirred vigorously under a nitrogen atmosphere. The mixture was irradiated using a $Co^{60}$ source at a dose rate of 0.32 megarads/hour for 31 hours to a total dose of 10 megarads. The fine white polymer particles produced were filtered and washed thoroughly. The resin was dried in vacuo at 60°C until the weight remained constant.

EXAMPLE 16

This example demonstrates the radiation initiated copolymerisation of 1,4-bis(N,N-diallylaminomethyl)-benzene dihydrochoride and N-benzyldiallylamine hydrochloride.

Aqueous solutions of 1,4-bis(N,N-diallylaminomethyl) benzene dihydrochloride and N-benzyldiallylamine hydrochloride were prepared by the method of Example 12. These aqueous solutions were mixed in varying proportions to give a clear solution.

Each mixture was placed separately in test tubes, and irradiated under vacuum for 31 hours at a dose rate of 0.32 megarads/hour (total dose 10 megarads). The solid product was in each case crushed to a particle size of 25 mesh and extracted with ethanol to give the required copolymer which was thoroughly washed and dried in vacuo at 60°C. The proportions of monomers used and the physical appearance of the product were as shown in Table 1.

TABLE 1

| Experiment No. | 50.7% w/v 1,4-bis-(N,N-diallylaminomethyl)benzene di-hydrochloride pH 5 | 74.7% w/v N-benzyl diallylamine hydrochloride solution pH5 | Mol. Ratio | Appearance after Irradiation |
|---|---|---|---|---|
| 1 | 15.9 | — | — | Very hard clear brittle gel |
| 2 | 15.9 | 1.62 | 80:20 | Hard clear brittle gel |
| 3 | 10.6 | 4.32 | 50:50 | Friable clear gel |
| 4 | 10.6 | 17.3 | 20:80 | Friable clear gel |
| 5 | 5.3 | 19.4 | 10:90 | Friable soft clear gel |

EXAMPLE 17

This example demonstrates the copolymerisation of 1,4-bis(N,N-diallylaminomethyl)benzene dihydrochloride and N-benzyldiallylamine hydrochloride using azo bis(isobutyramidinium chloride) as the initiator.

A stirred mixture of 1,4-bis(N,N-diallylaminomethyl) benzene (23.7 g) and N-benzyldiallylamine (59.9 g) was cooled to 0°C and 48 ml of 10 N hydrochloric acid added at such a rate that the temperature remained between 0°C and 5°C. Stirring was continued until the mixture had become homogeneous.

To 110.4 g of the above product were added 55.2 g of water and 1.41 g of azo bis(isobutyramidinium chloride). The mixture was stirred until it was homogeneous and then heated at 60°C under an atmosphere of nitrogen for 26 hours, by which time polymerisation of the mixture to a firm gel was essentially complete. The gel was transferred to a blender and macerated with water to obtain particles less than 25 mesh in size. The solid cake obtained by filtration of the slurry was thoroughly washed with 2N hydrochloric acid before being transferred to a column for washing with 0.3 N sodium hydroxide until no more chloride ion could be leached from the resin. The resin was finally rinsed free of sodium hydroxide with water and dried at 50°C. There was thus obtained 29.7 g of a copolymer of 1,4-bis-(N,N-diallylaminomethyl)benzene and N-benzyldiallylamine having an ionic ion exchange capacity of 5.6 meq./g.

EXAMPLE 18

This example demonstrates the preparation of composite beads suitable for use in the "Sirotherm" process from a copolymer of 1,4-bis(N,N-diallylaminomethyl)-benzene and N-benzyldiallylamine.

A dispersion in water of 27.8 g of a copolymer prepared according to Example 17 was adjusted to pH 4 by the addition of hydrochloric acid and ball milled overnight to reduce the size of the dispersed copolymer particles to 5 – 10 microns. The copolymer recovered by centrifuging the slurry was redispersed in 1900 ml of water and the dispersion slowly added to 281.8 g of a well stirred aqueous suspension of 1 – 5 micron particles of a crosslinked polyacrylic acid resin. The suspension of crosslinked polyacrylic acid particles used had a capacity of 1.29 meq./g and was adjusted to pH 4 before use. After the resultant mixture had been stirred sufficiently to ensure complete mixing of the two types of polymer particles sufficient hydrochloric acid was added to reduce the pH to 1.7 and after further mixing to ensure homogeneity of the mix the solids were separated by filtration. The filter cake was redispersed in 287.5 g of water and 63.5 g of a low molecular weight 88% hydrolysed poly(vinyl acetate) added. The mixture was stirred overnight by which time all the 88% hydrolysed poly(vinyl acetate) had dissolved.

Sufficient hydrochloric acid was added to 372 g of this mixture to reduce the pH to 1.5 before 13.4 g of 25% glutaraldehyde solution was introduced. After 2 min. of rapid mixing the whole was added to 3.9 litres of paraffin oil. Dispersion of the aqueous slurry was achieved by stirring with a 4 in. diameter serrated disc stirrer rotated at 1000 r.p.m. Stirring was maintained for 1 hour at ambient temperature (ca. 20°C) followed by 2 hours at 60°C at the reduced stirring rate of 600 r.p.m. The cooled product was filtered off, washed with hexane to remove the oil and with acetone to remove the hexane. Two alternate washes were carried out with each solvent. The product was cured in an air oven at 110°C for 150 min. to yield hard free flowing beads which were predominantly in the 16 – 60 mesh size range. They were spherical in shape and contained all the copolymer and crosslinked polyacrylic acid particles embedded in a crosslinked poly(vinyl alcohol) matrix.

EXAMPLE 19

This example demonstrates that composite beads made from a copolymer of 1,4-bis(N,N-diallylaminomethyl)benzene and N-benzyldiallylamine according to the procedure of Example 18 possess ion exchange properties and that the uptake of ions by such composite beads is thermally reversible.

Composite beads 16 – 60 mesh in size and containing a copolymer of 1,4-bis(N,N-diallylaminomethyl)benzene and N-benzyl diallylamine were prepared according to the procedure described in Example 18. The beads were washed in a column with 2N hydrochloric acid for two days, then with water and were finally equilibrated to pH 6.3. The beads (75 ml) were then packed into a column where 1340 ml of a cold (ca. 20°C) aqueous saline solution containing 393 p.p.m. of sodium ion and 46 p.p.m. of calcium ion was passed down the column through the beads at a flow rate of 1 gall./cu ft/min. Adsorption of sodium and calcium ions occurred totalling 0.163 meq./ml of bed, as shown by the fact that the mean concentrations of sodium and calcium ions in the product water were only 183 p.p.m. and 4.5 p.p.m. respectively.

The bed was then regenerated by passing through the column at the same flow rate 825 ml of aqueous saline containing 202 p.p.m. of sodium ion and held at a temperature of 80°C, whereupon a total of 0.157 meq./ml of bed of sodium and calcium ions was desorbed, as evidenced by the mean concentrations of sodium and calcium ions in the effluent being 531 and 100 p.p.m. respectively.

EXAMPLE 20

Preparation of N-(4-N',N'-di-n-propylaminomethyl benzyl) diallylamine.

A mixture of alpha alpha' dichloro para xylene (367.6 g) and ethylene dichloride (700 ml) was stirred and heated at 57°C until the solid had dissolved. Finely powdered sodium hydrogen carbonate (63 g) was then added followed by 156 ml of a solution of diallylamine (86 ml) in ethylene dichloride (120 ml) which was added at the rate of 35 ml per hour. The mixture was then stirred for 24 hours at 57°C before addition of another 50 ml of an identical solution of diallylamine in ethylene dichloride over a period of 2 hours. The temperature was kept at 57°C for an additional 4 hours before stirring was discontinued and the mixture allowed to cool overnight. The mixture was filtered under suction and the cake washed three times with small volumes of cold ethylene dichloride. The combined filtrate and washings were evaporated to a volume of 500 ml and cooled whereupon some alpha alpha' dichloro para xylene separated and was removed by filtration. The filtrate was evaporated to a volume of 200 ml and cooled whereupon more alpha alpha' dichloro para xylene separated. After removal of the solid by filtration as before the filtrate was evaporated under vacuum to give a dark oil from which additional solid separated after 2 days' standing at ambient temperature. The oil was filtered and then distilled to yield 85.7 g of a colourless oil, b.p. 98° – 102°C/0.2 mm Hg pressure, identified as 4-(N,N-diallylaminomethyl)benzyl chloride.

Di-n-propylamine (105 ml) was added to 45 g of 4-(N,N-diallylaminomethyl)benzyl chloride and the mixture allowed to stand for 2 hours before being heated for 24 hours at 80°C. A solution of sodium hydroxide (16 g) in water (16 ml) was added to the cooled mixture which was thoroughly shaken and then allowed to stand, whereupon an oil separated as an upper layer. The oil was removed and combined with an ether extract of the lower layer. Evaporation of the ether left a residue which was distilled to yield 53 g of a colourless oil, b.p. 110° – 114°C at 0.05 mm Hg pressure, which was identified as N-(4-N',N'-di-n-propylaminomethyl benzyl) diallylamine.

EXAMPLE 21

Preparation of 2,4,6-tris(N,N-diallylaminomethyl)-toluene

A mixture of 23.8g of 2,4,6-tris(chloromethyl)toluene and 87.3g of diallylamine was kept at 60°C for 30 hours and then allowed to cool to room temperature before the addition of a solution of 15g of sodium hydroxide in 70 ml of water. The mixture was transferrred to a separating funnel, well shaken and allowed to stand until the two layers had separated. The lower (aqueous) layer was removed and discarded before the upper layer was dried by shaking it with solid sodium hydroxide. After removal of the sodium hydroxide the upper layer was distilled under reduced pressure, there thus being recovered 60g of diallylamine and 37.6g of a residual high boiling oil which was identified as 2,4,6-tris(N,N-diallylaminomethyl)-toluene by elemental analysis infrared and nuclear magnetic resonance spectroscopy.

EXAMPLE 22

Preparation of 1,2,4-tris(N,N-diallylaminomethyl)-benzene

A stirred mixture of 15.6g of 1,2,4-tris(chloromethyl)-benzene with 61g of diallylamine was kept at 62°C for 28 hours and then allowed to cool to ambient temperature (ca. 20°C). A solution of sodium hydroxide (10.1g) in water (50 ml) was then added and the mixture transferred to a separating funnel where it was well shaken and then allowed to stand to permit the separation of two layers. The lower aqueous layer was withdrawn and discarded and the upper layer dried by shaking it with solid sodium hydroxide. The sodium hydroxide was then removed and the upper layer evaporated under reduced pressure, whereupon 43g of diallylamine were recovered. The residue was an oil (23.6g) which was identified as 1,2,4-tris(N,N-diallylaminomethyl)benzene by elemental analysis, infrared and nuclear magnetic resonance spectroscopy.

We claim:

1. The monomer:

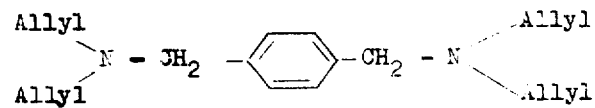

* * * * *